(12) United States Patent
Zhou et al.

(10) Patent No.: US 11,770,192 B2
(45) Date of Patent: Sep. 26, 2023

(54) WAVELENGTH LOCKING OPTICAL MODULE, DEVICE, AND WAVELENGTH LOCKING METHOD

(71) Applicant: Wuhan Telecommunication Devices Co., Ltd, Wuhan (CN)

(72) Inventors: Shunli Zhou, Wuhan (CN); Hui Zou, Wuhan (CN); Chenggang Liu, Wuhan (CN); Qinlian Bu, Wuhan (CN)

(73) Assignee: Wuhan Telecommunication Devices Co., Ltd

( * ) Notice: Subject to any disclaimer, the term of this patent is extended or adjusted under 35 U.S.C. 154(b) by 42 days.

(21) Appl. No.: 17/438,093

(22) PCT Filed: Dec. 13, 2019

(86) PCT No.: PCT/CN2019/125267
§ 371 (c)(1),
(2) Date: Sep. 10, 2021

(87) PCT Pub. No.: WO2020/186842
PCT Pub. Date: Sep. 24, 2020

(65) Prior Publication Data
US 2022/0216921 A1    Jul. 7, 2022

(30) Foreign Application Priority Data

Mar. 15, 2019 (CN) .......................... 201910196972.5

(51) Int. Cl.
*H04B 10/572* (2013.01)
*H04B 10/516* (2013.01)
*H04B 10/564* (2013.01)

(52) U.S. Cl.
CPC ......... *H04B 10/572* (2013.01); *H04B 10/516* (2013.01); *H04B 10/564* (2013.01)

(58) Field of Classification Search
CPC .... H04B 10/40; H04B 10/572; H04B 10/516; H04B 10/564; H04B 10/506; H04B 10/43; G02B 27/1006; G02B 27/106; H04J 14/02
See application file for complete search history.

(56) References Cited

U.S. PATENT DOCUMENTS

| 8,128,283 | B2 | 3/2012 | Hosking et al. |
| 2004/0008996 | A1 | 1/2004 | Aronson et al. |

(Continued)

FOREIGN PATENT DOCUMENTS

| CN | 101247199 A | 8/2008 |
| CN | 201118093 Y | 9/2008 |

(Continued)

OTHER PUBLICATIONS

International Search Report for PCT/CN2019/125267 dated Mar. 23, 2020; 2 pages.

(Continued)

*Primary Examiner* — Hibret A Woldekidan
(74) *Attorney, Agent, or Firm* — Lerner David LLP (57) ABSTRACT

The present invention relates to the technical field of optical communications, and particularly relates to a wavelength locking optical module, a device, and a wavelength locking method. The optical module comprises a DSP unit, a TOSA, and a ROSA. The DSP unit has a signal output terminal connected to the TOSA and a signal input terminal connected to the ROSA. A TEC is provided within the TOSA, and is used to adjust a temperature according to a control signal sent from the DSP unit and accordingly adjust a emission wavelength of the TOSA. An optical filter is provided within the ROSA and used to filter a wave, such that light having a pre-determined wavelength passes through the filter and is converted into an electrical signal and output to the DSP unit. The DSP unit calculates an (Continued)

optical power according to the received electrical signal, and determines wavelength control of the TOSA according to an optical power change. The present invention has the optical filter provided within the ROSA, combines an original optical detection capability of the ROSA and a signal processing capability of the DSP unit to monitor a wavelength change, and adjusts a wavelength by means of the TEC, thereby reducing TOSA volume, simplifying processes and reducing costs.

10 Claims, 2 Drawing Sheets

(56) References Cited

U.S. PATENT DOCUMENTS

| | | | |
|---|---|---|---|
| 2008/0226296 A1 | 9/2008 | Ichino | |
| 2009/0232493 A1 | 9/2009 | Tu | |
| 2012/0082462 A1* | 4/2012 | Mariotti | H04B 10/40 398/135 |
| 2012/0308239 A1* | 12/2012 | Sheth | H04B 10/1125 398/131 |
| 2013/0287392 A1* | 10/2013 | Heimbuch | H04B 10/0799 398/38 |
| 2015/0171596 A1 | 6/2015 | Onaka | |
| 2016/0043799 A1 | 2/2016 | Zheng et al. | |
| 2017/0222718 A1 | 8/2017 | Xue | |
| 2017/0353268 A1* | 12/2017 | Jung | H04J 14/02 |
| 2018/0164515 A1* | 6/2018 | Amit | G02B 27/1006 |
| 2020/0162186 A1* | 5/2020 | Chen | H04J 14/0216 |
| 2021/0175969 A1* | 6/2021 | Zhou | H04B 10/5563 |

FOREIGN PATENT DOCUMENTS

| | | |
|---|---|---|
| CN | 102749684 A | 10/2012 |
| CN | 104713704 A | 6/2015 |
| CN | 107005309 A | 8/2017 |
| CN | 107024744 A | 8/2017 |
| CN | 108333689 A | 7/2018 |
| CN | 109412013 A | 3/2019 |
| CN | 109981180 A | 7/2019 |
| CN | 110022186 A | 7/2019 |
| EP | 3723301 A1 | 10/2020 |

OTHER PUBLICATIONS

Search Report for Chinese Priority Application No. 2019101969725 dated Mar. 20, 2020; 3 pages.

Zhang Chen, Design and implementation of 10G tunable SFP Plus optical communication module , Publication Date: May 2018, Chinese Master's Thesis, China Academic Journal Electronic Publishing House, http://www.cnki.net copyright 1994-2021.

* cited by examiner

201 Filtering, by a second optical filter, an optical signal output from a first TOSA after entering a second ROSA, such that light of a preset wavelength passes through and is then converted into an electrical signal and output to a second DSP unit 202 Calculating detected optical power according to the received electrical signal and then transmitting an encoded signal containing wavelength adjustment to a second TOSA according to a change of the optical power by the second DSP unit, and converting the encoded signal into an optical signal and transmitting it to the first ROSA by the second TOSA 203 Converting the optical signal into an encoded signal and transmitting it to a first DSP unit by the first ROSA, and transmitting, by the first DSP unit, a control signal to a first TEC according to the encoded signal, and then regulating a emission wavelength of the first TOSA through temperature adjustment

Fig. 4

WAVELENGTH LOCKING OPTICAL MODULE, DEVICE, AND WAVELENGTH LOCKING METHOD

CROSS-REFERENCE TO RELATED APPLICATIONS

The present application is a national phase entry under 35 U.S.C § 371 of International Application No. PCT/CN2019/125267 filed Dec. 13, 2019, which claims priority from Chinese Application No. 201910196972.5 filed Mar. 15, 2019, all of which are hereby incorporated herein by reference.

TECHNICAL FIELD OF THE DISCLOSURE

The present disclosure relates to the technical field of optical communication, in particular to a wavelength locking optical module, device and a wavelength locking method thereof.

BACKGROUND

At present, a Dense Wavelength Division Multiplexing (DWDM) technique has been widely used in optical communication systems. This technique transmits multiple optical signals with different wavelengths through a single fiber, thereby increasing the number of communication channels and realizing a large capacity. In practical applications, the wavelength spacing between adjacent channels needs to be as small as possible, in order to increase the number of transmission channels. With the increase of the optical communication rate and the shortening of the wavelength spacing, the DWDM system puts forward more and more stringent requirements on the stability of the laser source wavelength. It is necessary to adopt effective wavelength stabilization technology to improve the wavelength stability of laser.

A wave locker is a device that locks a wavelength. A traditional wave locker is placed in an optical transmitting module TOSA. Specifically, a beam splitter (BS), a wavelength selection filter and two backlight detectors are provided in the TOSA. Signal light emitted by a laser is divided into two parts by the beam splitter, one of which enters a corresponding backlight detector after passing through the wavelength selection filter, and the other of which directly enters the corresponding backlight detector. The two backlight detectors monitor a wavelength change to achieve precise control of the wavelength, thus the TOSA has a complicated structure, its manufacturing process is complicated, and its volume is large, which increases the package size and not fit for miniaturization while the cost is high.

In view of this, it is an urgent problem to be solved in this technical field to overcome the above-mentioned defects in the prior art.

SUMMARY

The technical problem to be solved by the present application is as follows:

the traditional wave locker is placed in the TOSA, specifically, a beam splitter, a wavelength selection filter and two backlight detectors are arranged in the TOSA, which makes the structure and manufacturing process of the TOSA is complex, large in size, and higher in cost.

The present disclosure achieves the above objective through the following technical solutions.

In a first aspect, the present application provides a wavelength locking optical module comprising a DSP unit, a TOSA and a ROSA, a signal output end of the DSP unit being connected to the TOSA, and a signal input end of the DSP unit being connected to the ROSA; wherein the DSP unit is used for signal processing, the TOSA is used for light transmission, and the ROSA is used for light reception;

a TEC is arranged in the TOSA, and is used to adjust a temperature according to a control signal transmitted from the DSP unit, and then to adjust a emission wavelength of the TOSA;

the ROSA is provided with an optical filter (OF) therein, and the optical filter is used to filter the light entering the ROSA through the TOSA, such that the light with a preset wavelength is converted into an electrical signal and output to the DSP unit after passing through the optical filter; the DSP unit calculates optical power according to the received electrical signal, and monitors a wavelength change of the TOSA according to a change of the optical power, so as to adjust an output wavelength of the TOSA to a preset wavelength.

Preferably, the optical module further comprises an electrical interface (EI) and an optical interface (OI), wherein the electrical interface is connected to the DSP unit, such that an electrical signal transmitted by a system board is output to the DSP unit through the electrical interface; and the optical interface is respectively connected with the TOSA and ROSA, such that an optical signal emitted by the TOSA is output through the optical interface, and the ROSA receives the optical signal through the optical interface.

Preferably, an E/O conversion module is also arranged in the TOSA, and the E/O conversion module is connected to the DSP unit so as to receive an electrical signal transmitted by the DSP unit and convert the electrical signal into an optical signal to output; and An O/E conversion module is also arranged in the ROSA, and the O/E conversion module is respectively connected to the optical filter and the DSP unit to convert the received optical signal with the preset wavelength into an electrical signal, and output it to the DSP unit.

Preferably, a PD detector and a TIA are integrated in the O/E conversion module, wherein the PD detector is used to detect the optical signal and convert the detected optical signal with a preset wavelength into an electrical signal, and the TIA is used to realize an amplification of the electrical signal.

In a second aspect, the present disclosure also provides a wavelength locking device, comprising a first optical module and a second optical module, wherein the first optical module comprises a first DSP unit, a first TOSA, and a first ROSA, a signal output end of the first DSP unit being connected to the first TOSA, and a signal input end being connected to the first ROSA; and the second optical module comprises a second DSP unit, a second TOSA and a second ROSA, a signal output end of the second DSP unit being connected to the second TOSA, and a signal input end being connected to the second ROSA; a signal output end of the first TOSA being connected to a signal input end of the second ROSA, and a signal output end of the second TOSA being connected to a signal input end of the first ROSA;

wherein the first TOSA is provided with a first TEC therein, and the second ROSA is provided with a second optical filter (SOF) therein; an optical signal output by the first TOSA is filtered by the second optical filter after it enters the second ROSA, such that light with a preset wavelength is converted into an electrical signal after passing through and output to the second DSP unit, then the second DSP unit calculates optical power and generates an encoded signal containing a wavelength adjustment direction according to a change of the optical power to transmit to the second TOSA, then the second TOSA converts the encoded signal into an optical signal and transmits it to the first ROSA, then the first ROSA converts the optical signal into an encoded signal and transmits it to the first DSP unit, and then the first DSP unit transmits a control signal to the first TEC according to the encoded signal, and adjusts a temperature of the first TEC to make a emission wavelength of the first TOSA reach a preset wavelength.

Preferably, the first optical module further comprises a first electrical interface (FEI) and a first optical interface (FOI), and the second optical module further comprises a second electrical interface (SEI) and a second optical interface (SOI), wherein the first electrical interface is connected to the first DSP unit, and the second electrical interface is connected with the second DSP unit; and the first optical interface is respectively connected to the first TOSA and the first ROSA, the second optical interface is respectively connected to the second TOSA and the second ROSA, and the first optical interface is also connected to the second ROSA, then the optical signal from the first TOSA passes through the first optical interface and the second optical interface and enters the second ROSA, and the optical signal from the second TOSA passes through the second optical interface and the first optical interface and enters the first ROSA.

Preferably, a first DCM module and a first OA are connected between a signal output end of the first optical interface and a signal input end of the second optical interface, and a second DCM module and a second OA are connected between a signal output end of the second optical interface and a signal input end of the first optical interface;

wherein the first DCM module and the second DCM module are used for digital clock management, and the first OA and the second OA are used for amplifying the optical signal.

In a third aspect, the present disclosure further provides a wavelength locking method, in which the first optical module and the second optical module in the wavelength locking device described in the second aspect realize the mutual adjustment of wavelengths, and when a emission wavelength of the first optical module is locked to a preset wavelength, the wavelength locking method comprises:

after an optical signal output by a first TOSA enters a second ROSA, filtering the optical signal by a second optical filter to render light with a preset wavelength to pass through the second optical filter and to be converted into an electrical signal to output to a second DSP unit;

calculating detected optical power by the second DSP unit according to the received electrical signal, and transmitting an encoded signal containing wavelength adjustment to the second TOSA according to a change of the optical power, and then converting, by the second TOSA, the encoded signal into an optical signal for transmitting to the first ROSA; and converting the optical signal into an encoded signal and transmitting it to the first DSP unit by the first ROSA, and transmitting, by the first DSP unit, a control signal to the first TEC according to the encoded signal, and then adjusting the emission wavelength of the first TOSA through a temperature adjustment;

wherein when the detected optical power in the second ROSA reaches a maximum value, the emission wavelength of the first TOSA reaches the preset wavelength, realizing the wavelength locking of the first optical module.

Preferably, the step of transmitting the encoded signal containing wavelength adjustment to the second TOSA according to the change of the optical power change is specifically as follows:

comparing the currently calculated detected optical power with a maximum value of the optical power by the second DSP unit;

updating the maximum value of the optical power according to the comparison result, and at the same time judging a wavelength change of the first TOSA and determining a wavelength adjustment direction by the second DSP unit;

generating a corresponding FEC coded signal according to the wavelength adjustment direction and transmitting it to the second TOSA by the second DSP unit;

wherein an initial value of the maximum value of optical power is the detected optical power calculated for a first time by the second DSP unit based on the received electrical signal.

Preferably, the step of updating the maximum value of the optical power according to the comparison result, and at the same time judging the wavelength change of the first TOSA and determining the wavelength adjustment direction by the second DSP unit, is:

if the currently calculated detected optical power is greater than the maximum value of the optical power, the second DSP unit determines that the wavelength adjustment of the first TOSA is unnecessary this time, and saves the currently calculated detected optical power as the new maximum value of the optical power for using for the next comparison; and if the currently calculated detected optical power is less than the maximum value of the optical power, the second DSP unit determines that the optical signal output by the first TOSA has a wavelength shift, and then determines the wavelength adjustment direction of the first TOSA according to the detected optical power and the maximum value of the optical power.

The beneficial effects of the present disclosure are:

In the wavelength locking device provided by the embodiments of the present application, the structure in the TOSA is simplified, an optical filter is added in the ROSA, and the original optical detection function of the signal receiving end ROSA and the signal processing function of the DSP unit are combined to monitor the wavelength change, and then the information in respect of wavelength change is transmitted to the signal transmitting end of the TOSA, and then the laser wavelength is adjusted to the preset value through the TEC after the TOSA receives the signal. This structure reduces the volume of the TOSA, facilitating miniaturization of packaging, simplifying the process and reducing the production cost, and it effectively solves the problem of wavelength instability in the light transmission process of the DWDM system.

BRIEF DESCRIPTION OF THE DRAWINGS

In order to explain the technical solutions of the embodiments of the present application more clearly, the drawings that need to be used in the embodiments of the present application will be briefly explained hereafter. Obviously, the drawings described below are only some embodiments of the present application. For those of ordinary skill in the art, other drawings can be obtained based on these drawings without any creative works.

DETAILED DESCRIPTION

In order to make the objectives, technical solutions, and advantages of the present application clearer, the present application is further described in detail with reference to the accompanying drawings and embodiments hereafter. It should be understood that the specific embodiments described here are only used to explain the present application, but not to limit the present application.

In the description of the present application, the orientation or positional relationship indicated by the terms "inner", "outer", "longitudinal", "horizontal", "upper", "lower", "top", "bottom", "left", "right", "front" and "rear" is based on the orientation or positional relationship shown in the drawings, which is only for the convenience of describing the present application and does not require that the present application must be constructed and operated in the specific orientation. Therefore, they should not be understood as restrictions on the application in any way.

To facilitate understanding, first introduce the abbreviations that appear in the text:

DSP, Digital Signal Processing;
TOSA, Transmitter Optical Sub Assembly, a light transmission module;
ROSA, Receiver Optical Sub Assembly, a light reception module;
O/E, Optics/Electric, that is, an optical signal is converted into an electrical signal;
E/O, Electric/Optics, that is, an electrical signal is converted into an optical signal;
TEC, Thermo Electric Cooler, a semiconductor cooler;
MCU, Micro Controller Unit, a micro control unit;
CDR, Clock Data Recovery;
PD, Photo-Diode, a photodiode;
TIA, Trans-Impedance Amplifier, a transimpedance amplifier;
DCM, Digital Clock Manager, digital clock management;
OA, Optical Amplifier;
FEC, Forward Error Correction, a forward error correction code;

In addition, the technical features involved in the various embodiments of the present disclosure described below can be combined with each other as long as they do not conflict with each other. Hereinafter, the present application will be described in detail with reference to the accompanying drawings and embodiments.

Embodiment 1

Figure 1:
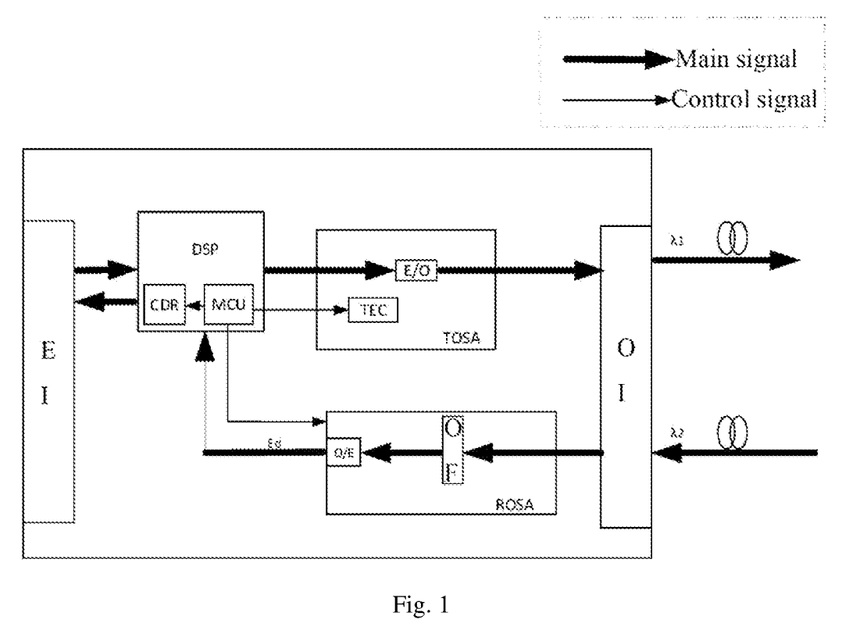
FIG. 1 is a structural schematic diagram of a wavelength locking optical module provided by an embodiment of the present application.

An embodiment of the present disclosure provides a wavelength locking optical module, which has a certain wavelength locking function and can be used to solve the problem of wavelength instability during light transmission in a DWDM system. As shown in FIG. 1, the optical module provided by the embodiment of the present application comprises a DSP unit, a light transmitting unit TOSA, and a light receiving unit ROSA, wherein a signal output end of the DSP unit is connected to the TOSA, and a signal input end of the DSP unit is connected to the TOSA; and wherein the DSP unit is used for signal processing, the TOSA is used for light transmission, and the ROSA is used for light reception.

Since a wavelength of the TOSA will shift with the temperature change of the optical module, in order to achieve a wavelength adjustment, a cooler TEC is provided in the TOSA, and the TEC can receive a control signal transmitted by the DSP unit, and adjust a temperature of the optical module according to the control signal, and then adjust the emission wavelength of the TOSA to ensure that the center wavelength of the TOSA is stable.

In order to achieve wavelength monitoring, the ROSA is provided with an optical filter therein. When the ROSA receives light emitted by another optical module TOSA, the optical filter can filter the light entering the ROSA such that the light with a preset wavelength is converted into an electrical signal and output to the DSP unit; then the DSP unit can calculate optical power according to the received electrical signal, and determine the wavelength adjustment of another optical module TOSA according to a change of the optical power, such that the output wavelength of said another optical module TOSA is adjusted to the preset wavelength. The preset wavelength is the expected output wavelength of the optical module TOSA, which is equivalent to the center wavelength hereinafter.

It should be noted that, in actual applications, the two above-mentioned optical modules cooperate to achieve the wavelength adjustment of each other, that is, a module A is used to monitor the emission wavelength of a module B, and the wavelength of the module B is adjusted by the TEC of the module B; the module B is used to monitor the emission wavelength of the module A, and the wavelength of the module A is adjusted by the TEC of the module A. For the specific integrated structure, please refer to Embodiment 2, and it will not be repeated here.

In the above-mentioned wavelength locking optical module provided by the embodiment of the present application, the structure in the TOSA is simplified, an optical filter is added in the ROSA, and the intrinsic light detection function of the signal receiving end ROSA and the signal processing function of the DSP unit are combined to monitor the wavelength change, then the information about the wavelength change is transmitted to the signal transmission end TOSA, and after the TOSA receives the signal, the laser wavelength is adjusted to the preset value by the TEC. This structure reduces the volume of the TOSA, facilitates miniaturization of packaging, simplifies the process, and reduces the production cost, which can effectively solve the problem of wavelength instability in the light transmission process of the DWDM system.

The structure of the optical module will be described in detail below in conjunction with the drawings:

With reference to FIG. 1, in a specific embodiment, a complete optical module comprises five parts: an electrical interface, a DSP unit, a TOSA, a ROSA, and an optical interface. The electrical interface is respectively connected with a system board and the DSP unit, thereby realizing the connection between the optical module and the system board. The DSP unit realizes electrical signal processing, and integrates an AD sampling function, a MCU control processing function, and a data clock recovery function of CDR, etc. The TOSA converts an input electrical signal into an optical signal and outputs the same, and has a wavelength adjustment function. Specifically, the TOSA comprises an E/O conversion module and a TEC. The E/O conversion module is connected to the DSP unit, such that the E/O conversion module receives an electrical signal transmitted from the DSP unit, and converts the electrical signal into an optical signal and outputs the same. The TEC realizes a wavelength adjustment. The ROSA converts the received optical signal into an electrical signal for output, and has a wavelength monitoring function. Specifically, the ROSA comprises an optical filter and an O/E conversion module. The O/E conversion module is connected to the optical filter and the DSP respectively, such that the O/E conversion module converts the received optical signal with the preset wavelength into an electrical signal and outputs it to the DSP unit. The optical interface is respectively connected with the TOSA and ROSA, such that the optical signal emitted by the TOSA is output through the optical interface, and the ROSA receives the optical signal through the optical interface.

The O/E conversion module is integrated with a PD detector and a trans-impedance amplifier TIA. The PD detector is used for detecting an optical signal and converting the detected optical signal into an electrical signal. The TIA is used for realizing the amplification of electrical signals.

In a practical application, an electrical signal transmitted by the system board is input to the DSP unit through the electrical interface, then is performed waveform shaping and amplitude amplification by the DSP unit, and then is output to the TOSA; and the TOSA convents the electrical signal into an optical signal and output it through the optical interface. After receiving the optical signal through the optical interface, the ROSA converts the wavelength change of the optical signal into an electrical signal, and outputs it to the DSP unit for processing. The electrical signal sent by the system board is usually a differential signal.

Figure 2:
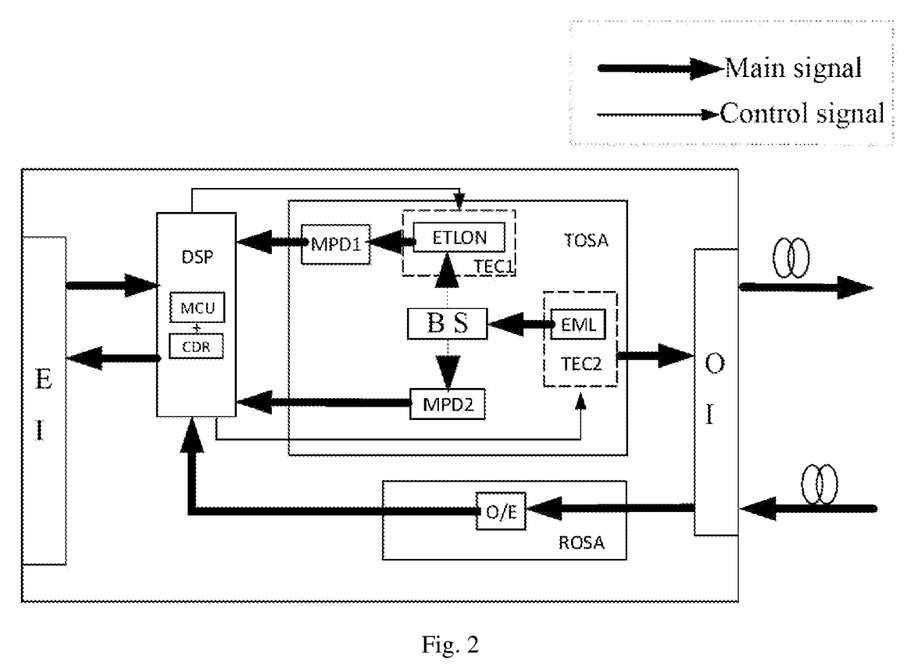
FIG. 2 is a structural schematic diagram of a conventional wavelength locking optical module.

Referring to FIG. 2, the traditional optical module with a wavelength locking function also comprises five parts: an electrical interface, a DSP unit, a TOSA, a ROSA, and an optical interface, the main difference between which and the present embodiment lies in that the TOSA of the traditional optical module is integrated with an EML laser, a beam splitter, a backlight detector MPD1, a backlight detector MPD2, a cooler TEC1, a cooler TEC2 and an ETLON. The ETLON is a kind of etalon, which could only be passed by the light of the center wavelength, and has the function similar to that of the optical filter. However, the characteristics of ETLON are easily affected by a temperature, and light of different center wavelengths can be passed under different temperature conditions.

According to the structure shown in FIG. 2, the principle of wavelength locking is as follows: the optical signal generated by the EML laser is transmitted to the beam splitter, and the beam splitter transmits a part of the light to the ETLON, which is filtered by the ETLON and then transmitted to the MPD1, then the MCU calculate the optical power corresponding to the center wavelength based on the magnitude of a current generated by the MPD1 and the proportion of light allocated to the MPD1; the other part of the light is directly transmitted to the MPD2, and the MCU calculates the actual optical power based on the magnitude of the current generated by the MPD2 and the proportion of light allocated to the MPD2. By calculating the difference between the optical power corresponding to the center wavelength and the actual optical power, the MCU outputs a control signal to TEC2 in IIC mode, thereby adjusting the laser temperature and then adjusting the wavelength. At the same time, the MCU constantly monitors the temperature of the ETLON through the temperature sensor to maintain the stability of the center wavelength of the transmitted light. When the difference between the optical power corresponding to the center wavelength and the actual optical power is zero, the actual light wavelength is equal to the center wavelength, thereby achieving the purpose of wavelength adjustment.

It can be seen that in the traditional optical module, in order to achieve wavelength locking, multiple separate components are required in the TOSA, which will greatly increase the number of components and lead to a large volume for the optical module, going against the miniaturization and making the structure be complicated and costly. Moreover, the assembly process of multiple separate components is extremely complicated. On the contrary, in the optical module provided by the embodiments of the present application, the number of components in the TOSA is greatly reduced, the original optical detectors in the ROSA are fully utilized, only an optical filter is added in the ROSA for filtering, and the mutual wavelength adjustment can be realized by cooperation of the two optical modules, which reduces the volume of the TOSA, facilitates the miniaturized package of the optical module, and has a simpler structure, a simplified process, and a reduce production cost.

Embodiment 2

Figure 3:
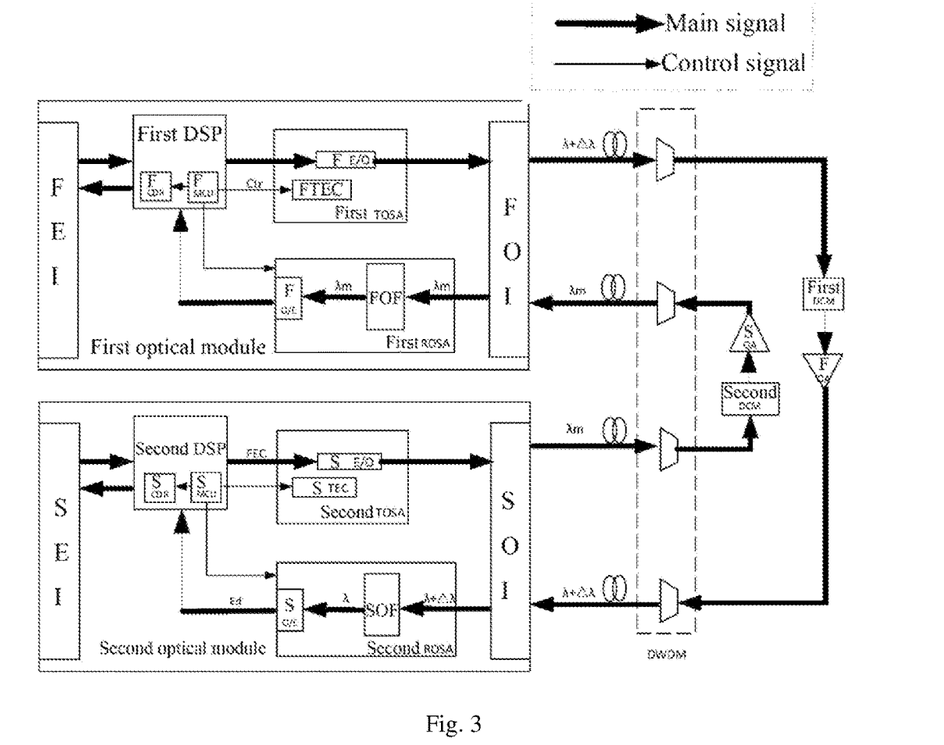
FIG. 3 is a structural schematic diagram of a wavelength locking device provided by an embodiment of the present application.

On the basis of the above Embodiment 1, an embodiment of the present application integrates two wavelength locking optical modules, and further provides a wavelength locking device, which is used to solve the problem of wavelength instability during light transmission in the DWDM system. As shown in FIG. 3, the wavelength locking device comprises a first optical module and a second optical module. The structures of the two optical modules are the same as those of the optical modules in Embodiment 1 (i.e., as shown in FIG. 1), and so do the functions of the components. In the embodiments of the present disclosure, terms such as "first" and "second" are used only for ease of description. The specific structures of the wavelength locking device are as follows.

The first optical module comprises a first electrical interface, a first DSP unit, a first TOSA, a first ROSA, and a first optical interface. The first electrical interface is connected to the first DSP unit. A signal output end of the first DSP unit is connected to the first TOSA, and a signal input end is connected to the first ROSA. The first optical interface is respectively connected to the first TOSA and the first ROSA. The first DSP unit is provided with a first CDR (FCDR) and a first MCU (FMCU). The first TOSA is provided with a first TEC (FTEC) and a first E/O (F E/O) conversion module, and the first ROSA is provided with a first optical filter and a first O/E (F O/E) conversion module, wherein a first PD detector and a first trans-impedance amplifier TIA are integrated in the first O/E conversion module.

The second optical module comprises a second electrical interface, a second DSP unit, a second TOSA, a second ROSA, and a second optical interface. The second electrical interface is connected to the second DSP unit. A signal output end of the second DSP unit is connected to the second TOSA, and a signal input end is connected to the second ROSA. The second optical interface is respectively connected to the second TOSA and the second ROSA. The second DSP unit is provided with a second CDR and a second MCU, the second TOSA is provided with a second TEC and a second E/O conversion module, and the second ROSA is provided with a second optical filter and a second O/E conversion module, wherein a second PD detector and a second trans-impedance amplifier TIA are integrated in the second O/E conversion module.

For the specific structures and functions of each part of the two optical modules in the wavelength locking device, reference may be made to the related description in Embodiment 1, which will not be repeated here.

With further reference to FIG. 3, the connection relationship between the two optical modules is as follows: the first optical interface is connected to the second optical interface, specifically, the signal output end of the first optical interface is connected to the signal input end of the second optical interface, and the signal output end of the second optical interface is connected to the signal input end of the first optical interface; then the signal output end of the first TOSA is connected to the signal input end of the second ROSA through the first optical interface and the second optical interface, and the signal output end of the second TOSA is connected to the signal input end of the first ROSA through the second optical interface and the first optical interface, so that the optical signal emitted by the first TOSA passes through the first optical interface and outputs, and enters the second ROSA through the second optical interface; and the optical signal output by the second TOSA is output through the second optical interface and enters the first ROSA through the first optical interface.

A first DCM module and a first OA (FOA) are also connected between the signal output end of the first optical interface and the signal input end of the second optical interface, and a second DCM module and a second OA (SOA) are also connected between the signal output end of the second optical interface and the signal input ends of the first optical interface. The first DCM module and the second DCM module may be used for digital clock management of the transmitted optical signal, and the first OA and the second OA are used for amplifying the optical signal.

By means of the wavelength locking device provided by the embodiment of the present application, the emission wavelengths of the first optical module and the second optical module can be adjusted, that is, the first optical module can monitor the emission wavelength of the second optical module to realize the wavelength adjustment on the second optical module; and the second optical module can monitor the emission wavelength of the first optical module to realize the wavelength adjustment of the first optical module. For the specific adjustment method, please refer to Embodiment 3, and it will not be repeated here.

Of course, in practical applications, the wavelength locking device is not limited to arranging two optical modules, but a greater number of optical modules can be arranged according to actual needs, and multiple optical modules are matched in pairs to form a group, such that each optical module can achieve wavelength locking.

Embodiment 3

Figure 4:
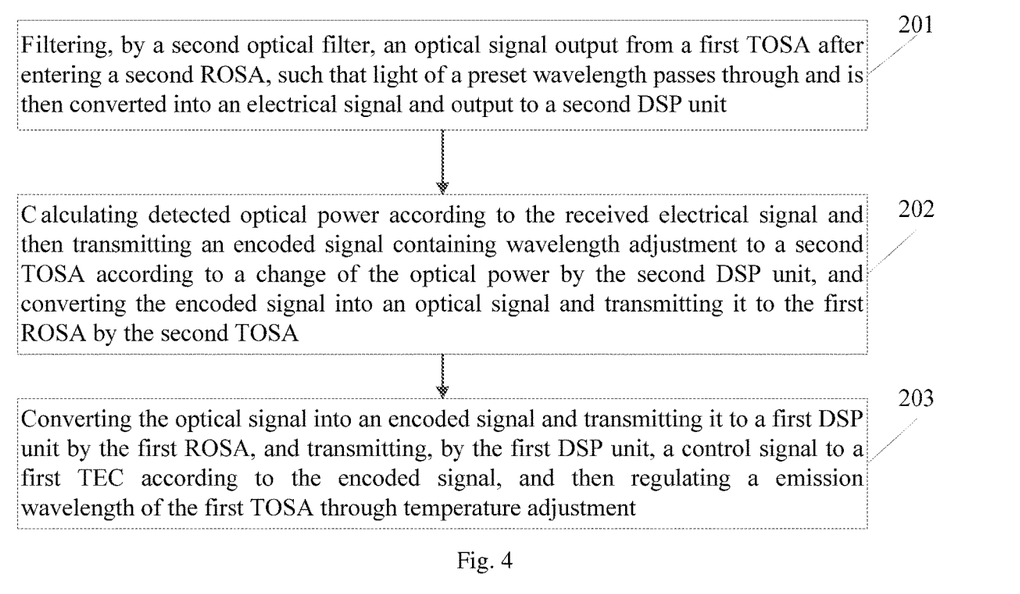
FIG. 4 is a flowchart of a wavelength locking method provided by an embodiment of the present application.

On the basis of the foregoing embodiment 2, an embodiment of the present disclosure further provides a wavelength locking method, which is completed by the wavelength locking device described in embodiment 2. Combining Embodiment 1 and Embodiment 2, it can be seen that when performing the wavelength adjustment, the mutual control of the wavelength needs to be realized by the first optical module and the second optical module, then when the emission wavelength of the first optical module needs to be controlled to reach a preset wavelength, refer to FIG. 4 for the wavelength locking method, which specifically comprises:

Step 201: filtering, by a second optical filter, an optical signal output from a first TOSA after entering a second ROSA, such that light of a preset wavelength passes through and is then converted into an electrical signal and output to a second DSP unit.

With reference to FIG. 3, the first TOSA of the first optical module outputs an optical signal $\lambda+\Delta\lambda$, with a wavelength change through the first optical interface. After sequentially passing through the first DCM module and the first OA, the optical signal enters the second ROSA of the second optical module through the second optical interface. Then, after being filtered by the second optical filter, the optical signal of wavelength $\lambda$ is transmitted to the second O/E module, and is converted by the second PD detector inside the second O/E module into the current signal Ed, and then is transmitted to the second DSP unit. $\lambda$ here represents the preset wavelength of the first optical module, that is, the central wavelength. During the transmission process, due to the influence of temperature or fiber loss and other factors, part of the light will have a wavelength shift, that is, it deviates from the central wavelength $\lambda$, so the wavelength of the optical signal during the transmission process can be represented by $\lambda+\Delta\lambda$.

In the actual light transmission, after filtering with the second optical filter, only the light with the center wavelength $\lambda$ is transmitted to the second PD detector, and the other part of the light with wavelength shifted cannot pass, resulting in that the detected optical power in the second ROSA is less than the actual optical power. If all the wavelengths of light emitted by the first optical module reach the center wavelength, that is, there is no wavelength shift, the light received by the second ROSA can pass through the second optical filter, and at this time the detected optical power and the actual optical power is equal with each other, thus the detected optical power reaches the maximum value. Therefore, it is necessary to continue to perform the wavelength detection and adjustment as long as the detected optical power in the second optical module does not reach the maximum value; it can be demonstrated that all of the emission wavelengths of the first TOSA have reach the preset wavelength, and the wavelength locking of the first optical module is realized, only when the detected optical power in the second optical module reaches the maximum value.

Step 202: calculating detected optical power according to the received electrical signal and then transmitting an encoded signal containing wavelength adjustment to a second TOSA according to a change of the optical power by the second DSP unit, and converting the encoded signal into an optical signal and transmitting it to the first ROSA by the second TOSA.

With reference to FIG. 3, the step of transmitting the encoded signal containing wavelength adjustment to the second TOSA according to the change in the optical power is specifically as follows: by means of the second DSP unit, comparing the currently calculated detected optical power with a maximum value of the optical power, then selectively updating the maximum value of the optical power according to the comparison result, and at the same time, judging a wavelength change of the first TOSA and determining a wavelength adjustment direction, and then generating a corresponding FEC encoded signal according to the wavelength adjustment direction and transmitting it to the second TOSA. Finally, converting the FEC coded signal into an optical signal $\lambda$m and transmitting it to the first ROSA by the second TOSA, wherein the FEC coded signal is an electrical signal containing the wavelength adjustment direction. That is, after the conversion by the second TOSA, the wavelength adjustment direction may be further included in the optical signal km.

It should be noted that the entire system is always under dynamic control, instead of stopping after the wavelength has been controlled, that is, it is necessary to continuously repeat steps 201-203 to perform multiple adjustments, and for each adjustment, the second DSP unit performs one power calculation at a time; the initial value of the maximum optical power is the detected optical power calculated by the second DSP unit for the first time based on the received electrical signal. In each subsequent adjustment, the maximum value M can be updated such that M is always the maximum value of the optical power in the multiple detections so far, and it is judged whether the wavelength has been locked, specifically:

If the currently calculated detected optical power is greater than the maximum optical power, it is determined that the maximum optical power needs to be updated, and the currently calculated detected optical power is saved as the new maximum optical power for use in the next comparison; and since the detected optical power this time has already been the maximum value of the optical power in multiple detections so far, it is judged that the wavelength adjustment of the first TOSA is not required this time. The specific calculation and judgment process can be implemented by the second MCU in the second DSP unit.

If the currently calculated detected optical power is less than the maximum optical power, that is, it has not reached the maximum value currently, it can be determined that the optical signal output by the first TOSA has a wavelength shift, and the emission wavelength of the first TOSA needs to be adjusted, and then the wavelength adjustment direction of the first TOSA is determined according to the difference between the detected optical power and the maximum optical power; at the same time, the maximum optical power does not need to be updated and can still be used during the next adjustment.

For example, if the detected optical power during the first adjustment is 100, then M=100; if the detected optical power during the second adjustment is 80, since 80<100, there is no need to update the maximum value, i.e., still M=100, and because the currently detected optical power has not reached the maximum value, the wavelength adjustment is required. If the detected optical power during the second adjustment is 120, since 120>100, the maximum value update is required, i.e., M=120, and because the currently detected optical power is the current maximum value, there is no need to perform wavelength adjustment this time. Each subsequent adjustment will so be performed, and won't be repeated here.

Step 203: converting the optical signal into an encoded signal and transmitting it to a first DSP unit by the first ROSA, and transmitting, by the first DSP unit, a control signal to a first TEC according to the encoded signal, and then regulating a emission wavelength of the first TOSA through temperature adjustment.

The first ROSA converts the optical signal km into an electrical signal and transmits it to the first DSP unit, where the electrical signal is the FEC encoded signal generated by the second DSP unit, and the first DSP unit can know the wavelength adjustment direction contained in the FEC coded signal by decoding it, and then the first MCU transmits a control signal Ctr to the first TEC in the manner of IIC to adjust the temperature of the first TEC, and then adjust the wavelength of the emitted light from the first TOSA.

When the detected optical power obtained by the second optical module remains unchanged for n consecutive times and is always at the maximum value, it can be considered that there is nonoccurrence of wavelength shift for all wavelengths emitted by the first optical module, that is, all wavelengths are the center wavelength and the purpose of wavelength locking is achieved. Here, n can be specifically selected according to actual needs, for example, it can usually take a value in the range of 3-6.

The above is the wavelength locking method of the first optical module. When the second optical module needs to be wavelength locked, the wavelength adjustment direction can be determined through the wavelength detection by the first optical module, and then the wavelength can be adjusted by the second TEC of the second optical module. The specific process is similar to the above step 201 to step 203, and will not be repeated here.

Wavelength locking can be effectively achieved and the problem of wavelength instability in the DWDM system during the light transmission process can be solved through the above wavelength locking method provided by the embodiment of the present application, utilizing the filter function of the signal receiving end ROSA and the intrinsic light detection function, combining with the signal processing function of the DSP unit to monitor the wavelength change, and then transmitting the information of the wavelength change to the TOSA of signal transmitting end, thereby adjusting the laser center wavelength to a preset value through the TEC at the transmitting end.

The above are only the preferred embodiments of the present application and are not intended to limit the present application. Any modification, equivalent replacement and improvement made within the spirit and principle of the present application shall be included in the protection scope of the present application.

What is claimed is:

1. A wavelength locking optical module, characterized in comprising a DSP (digital signal processing) unit, a TOSA (transmitter optical subassembly) and a ROSA (receiver optical subassembly), wherein a signal output end of the DSP unit is connected to the TOSA, and a signal input end of the DSP unit is connected to the ROSA; the DSP unit is used for signal processing, the TOSA is used for light emission, and the ROSA is used for light reception; the TOSA is provided with a TEC (thermoelectric cooler) therein, and the TEC is used to adjust a temperature according to a control signal transmitted from the DSP unit, and then adjust an emission wavelength of the TOSA; the ROSA is provided with an optical filter therein, and the optical filter is used to filter light entered the ROSA from a TOSA of another wavelength locking optical module, such that the light of a preset wavelength is converted into an electrical signal and output to the DSP unit after passing through; the DSP unit calculates optical power according to the received electrical signal, and monitors a wavelength change of the TOSA according to a change of the optical power, so as to adjust an output wavelength of the TOSA to a preset wavelength.

2. The wavelength locking optical module of claim 1, characterized in that the optical module further comprises an electrical interface and an optical interface, wherein the electrical interface is connected to the DSP unit such that the electrical signal emitted by the system board is output to the DSP unit through the electrical interface; and the optical interface is respectively connected to the TOSA and the ROSA, such that an optical signal emitted by the TOSA is output through the optical interface, and the ROSA receives the optical signal through the optical interface.

3. The wavelength locking optical module of claim 1, characterized in that the TOSA is further provided with an E/O (electrical to optical) conversion module therein, and the E/O conversion module is connected to the DSP unit to receive the electrical signal transmitted from the DSP unit and to convert the electrical signal into an optical signal for output; the ROSA is further provided with an O/E (optical to electrical) conversion module therein, and the O/E conversion module is respectively connected to the optical filter and the DSP unit, so as to convert the received optical signal of the preset wavelength into an electrical signal and output it to the DSP unit.

4. The wavelength locking optical module of claim 3, characterized in that a PD detector and a TIA (Trans-Impedance Amplifier) are integrated in the O/E conversion module, the PD (Photo-Diode) detector being used for detecting the optical signal and converting the detected optical signal of the preset wavelength into an electrical signal, and the TIA being used to amplify the electrical signal.

5. A wavelength locking device, characterized in comprising a first optical module and a second optical module, the first optical module comprising a first DSP (digital signal processing) unit, a first TOSA (transmitter optical subassembly), and a first ROSA (receiver optical subassembly), a signal output end of the first DSP unit being connected to the first TOSA, and a signal input end being connected to the first ROSA; and the second optical module comprising a second DSP unit, a second TOSA, and a second ROSA, a signal output end of the second DSP unit being connected to the second TOSA, a signal input end being connected to the second ROSA; a signal output end of the first TOSA being connected to a signal input end of the second ROSA, and a signal output end of the second TOSA being connected to a signal input end of the first ROSA; wherein the first TOSA is provided with a first TEC (thermoelectric cooler) therein, and the second ROSA is provided with a second optical filter therein; after an optical signal output by the first TOSA enters the second ROSA, the second optical filter filters the optical signal, such that light of a preset wavelength is converted into an electrical signal and then output to the second DSP unit; the second DSP unit calculates optical power, and generates and transmits an encoded signal containing a wavelength adjustment direction according to a change in the optical power, to the second TOSA; the second TOSA converts the encoded signal into an optical signal and sends it to the first ROSA; the first ROSA converts the optical signal into an encoded signal and transmits it to the first DSP unit; and the first DSP unit transmits a control signal to the first TEC according to the encoded signal, and then adjusts a temperature of the first TEC to make an emission wavelength of the first TOSA to be a preset wavelength.

6. The wavelength locking device of claim 5, characterized in that the first optical module further comprises a first electrical interface and a first optical interface, and the second optical module further comprises a second electrical interface and a second optical interface, wherein the first electrical interface is connected to the first DSP unit, and the second electrical interface is connected to the second DSP unit; and
the first optical interface is respectively connected to the first TOSA and the first ROSA, the second optical interface is respectively connected to the second TOSA and the second ROSA, and the first optical interface is further connected to the second ROSA, then the optical signal of the first TOSA enters the second ROSA through the second optical interface after passing through the first optical interface; and the optical signal of the second TOSA enters the first ROSA through the first optical interface after outputting through the second optical interface.

7. The wavelength locking device of claim 6, characterized in that a first DCM (digital clock management) module and a first OA (Optical Amplifier) are connected between a signal output end of the first optical interface and a signal input end of the second optical interface, and a second DCM module and a second OA are connected between a signal output end of the second optical interface and a signal input end of the first optical interface; wherein the first DCM module and the second DCM module are used for digital clock management, and the first OA and the second OA are used for amplifying the optical signal.

8. A wavelength locking method, characterized in that a mutual adjustment of wavelengths is achieved by a first optical module and a second optical module, and when an emission wavelength of the first optical module needs to be locked to a preset wavelength, the wavelength locking method comprises: filtering, by a second optical filter, an optical signal output by a first TOSA (transmitter optical subassembly) after entering a second ROSA (receiver optical subassembly), such that light of the preset wavelength is converted into an electrical signal and then output to a second DSP (digital signal processing) unit after passing through; calculating detected optical power according to the received electrical signal and transmitting an encoded signal containing wavelength adjustment to a second TOSA according to a change of the optical power by means of the second DSP unit, and then converting the encoded signal into an optical signal to transmit to the first ROSA by means of the second TOSA; converting the optical signal into an encoded signal and transmitting it to the first DSP unit by the first ROSA, and by the first DSP unit, emitting a control signal to a first TEC (thermoelectric cooler) according to the encoded signal, and then adjusting the emission wavelength of the first TOSA through temperature adjustment; wherein when the detected optical power in the second ROSA reaches a maximum value, the emission wavelength of the first TOSA reaches the preset wavelength, and wavelength locking of the first optical module is realized.

9. The wavelength locking method of claim 8, characterized in that the step of emitting the encoded signal containing wavelength adjustment to the second TOSA according to the change of the optical power is specifically: comparing the currently calculated detected optical power with a maximum value of the optical power by the second DSP unit; updating the maximum value of the optical power according to the comparison result, and at the same time judging a wavelength change of the first TOSA and determining a wavelength adjustment direction by the second DSP unit; generating a corresponding FEC (Forward Error Correction) coded signal according to the wavelength adjustment direction, and transmitting it to the second TOSA by the second DSP unit; wherein an initial value of the maximum value of the optical power is the detected optical power calculated for the first time by the second DSP unit based on the received electrical signal.

10. The wavelength locking method of claim 9, characterized in that the step of updating the maximum value of the optical power according to the comparison result, and at the same time judging the wavelength change of the first TOSA and determining the wavelength adjustment direction by the second DSP unit is specifically:

if the currently calculated detected optical power is greater than the maximum value of the optical power, the second DSP unit determines that the wavelength adjustment of the first TOSA is unnecessary this time, and saves the currently calculated detected optical power as the new maximum value of the optical power for using during the next comparison; and if the currently calculated detected optical power is less than the maximum value of the optical power, the second DSP unit determines that the optical signal output by the first TOSA has a wavelength shift, and then determines the wavelength adjustment direction of the first TOSA according to the detected optical power and the maximum value of the optical power.

* * * * *